(No Model.)

G. KROULIK & L. BILAN.
CORN PLANTER.

No. 287,384. Patented Oct. 23, 1883.

Witnesses
J. B. Connolly
A. A. Connolly

George Kroulik
Louis Bilan
Inventors by Connolly Bros
Attorneys

UNITED STATES PATENT OFFICE.

GEORGE KROULIK AND LOUIS BILAN, OF IOWA CITY, IOWA.

CORN-PLANTER.

SPECIFICATION forming part of Letters Patent No. 287,384, dated October 23, 1883.

Application filed May 3, 1883. (No model.)

*To all whom it may concern:*

Be it known that we, GEORGE KROULIK and LOUIS BILAN, citizens of the United States, residing at Iowa City, in the county of Johnson and State of Iowa, have invented certain new and useful Improvements in Corn-Planters; and we do hereby declare the following to be a full, clear, and exact description of the invention, such as will enable others skilled in the art to which it appertains to make and use the same, reference being had to the accompanying drawings, in which—

Figure 1:
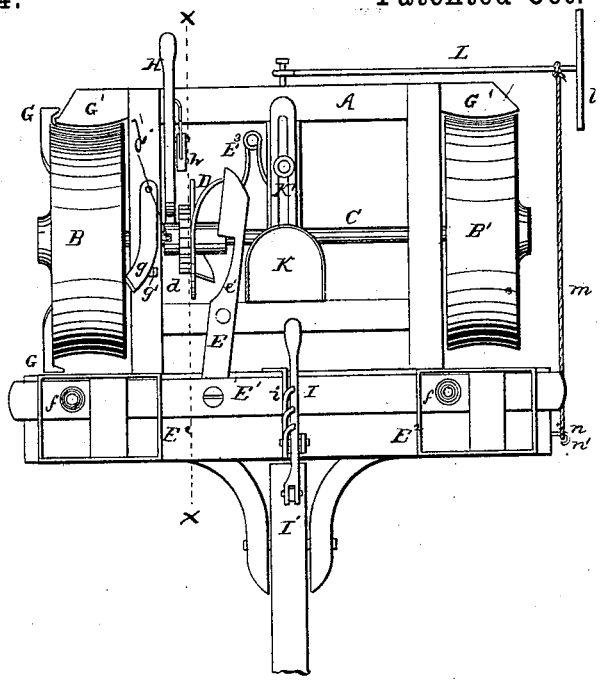
Figure 2:
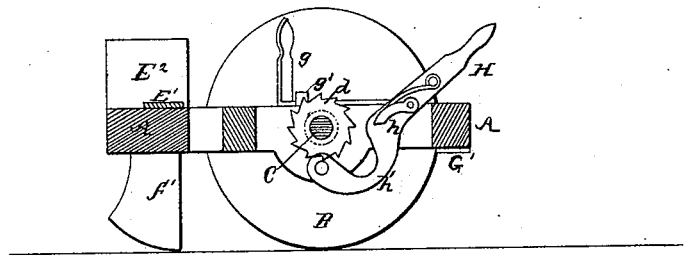

Figure 1 is a plan view, and Fig. 2 a sectional view, of our improvement on line $x\ x$.
Our invention has relation to that class of corn-planters in which the dropping of the corn at regular intervals is effected by a slide operated from the driving-shaft, which carries a cam actuating a lever connected with the slide.

Our invention consists in the novel construction and combination of parts, as hereinafter described and claimed, the special feature of novelty being in the cam and appurtenant devices for reciprocating the dropping-slide.

Referring to the accompanying drawings, A designates a rectangular frame, mounted upon wheels or rollers B B', having broad concave peripheries adapting them to the purpose of coverers. These wheels are keyed to a transverse shaft, C, which carries a double-winged cam, D, having on one of its faces a ratchet-wheel, $d$, with a clutch-collar, which engages with the teeth or feathers $d'$ on the shaft, so that when the latter turns the cam will also turn.

E is a lever pivoted to a cross-bar of the frame A, and connected to the dropping-slide E', which enters the seed-hoppers $E^2$. The lever E is pressed and held against the cam D by a spring, $E^3$, so that when the cam turns the end of the lever will be moved laterally and the feeding-slide moved longitudinally.
The lever E is notched at $e'$, so that while one wing of the cam is in contact with the lever the other wing will pass the lever freely. The retraction of the lever and feeding-slide is effected by the spring $E^3$; hence as the imple-
ment moves along the slide regularly reciprocates, alternately filling its pockets $f$ and emptying them through the tubes $f'$.

G G are plates or bars secured to the outer face of the wheel B, and projecting beyond the periphery at points diametrically opposite each other. The ends of these plates or bars enter the soil at the points where the corn is deposited and mark the same.

G' are curved scrapers attached to the rear of the frame, so as to project laterally back of the wheels, and close to the surfaces of the same.

To one of the side bars of the frame is attached a lever, H, armed with a spring pawl or dog, $h$. This lever is movable laterally, and has a curve at $h'$, to embrace or encircle the ratchet $d$. This lever is employed to shift the cam upon the shaft C and disengage the clutch, so that in going to and from the cornfield the slide will not be operated. A lever, $g$, attached to the frame A, and lying, when not in use, behind a stud or flanged plate, $g'$, is adjusted between the lever H and said stud or plate when the cam is shifted as stated, and thus locks the lever and cam in their shifted positions.

The object of the ratchet $d$ and the pawl is to allow the cam to be turned independently of the shaft, so as to set the former so that its operations will properly correspond with the positions of the markers on the driving-wheel.

The frame is raised and lowered by means of a bent lever, I, fulcrumed on the front of the frame A and linked to the end of the tongue I'. This lever engages with a segmental rack, $i$, by which it is locked in position.

K is the driver's seat, mounted upon a slotted and adjustable standard, K'.

L designates a row-marker or gage, consisting of a bar pivoted or swiveled upon the rear of the frame, moving between the sides, and carrying an oval disk or plate, $l$, on its outer end. This marker may be swung to either side of the frame. A cord, $m$, attached to the rod L, and having a loop, $n$, to catch on hook $n'$, is used to fasten the marker, and may be handled by the driver without dismounting.

What we claim, and desire to secure by Letters Patent, is—

The combination, with the driving-wheels B B', the driving-shaft C, having studs or clutch-pins d', double-winged cam D, ratchet d, lever E, spring E³, and seed-dropping slide, of the lever H, for shifting said cam and ratchet, said lever being armed with a pawl or dog. h, to engage with said ratchet, for turning and setting said cam, substantially as described.

In testimony whereof we affix our signatures in presence of two witnesses.

GEORGE KROULIK.
LOUIS BILAN.

Witnesses:
JOS. K. SMIDT,
PETER B. BOARTS.